No. 799,805. PATENTED SEPT. 19, 1905.
C. G. SIMONDS.
POWER TRANSMISSION MECHANISM.
APPLICATION FILED APR. 8, 1904.
3 SHEETS—SHEET 1.
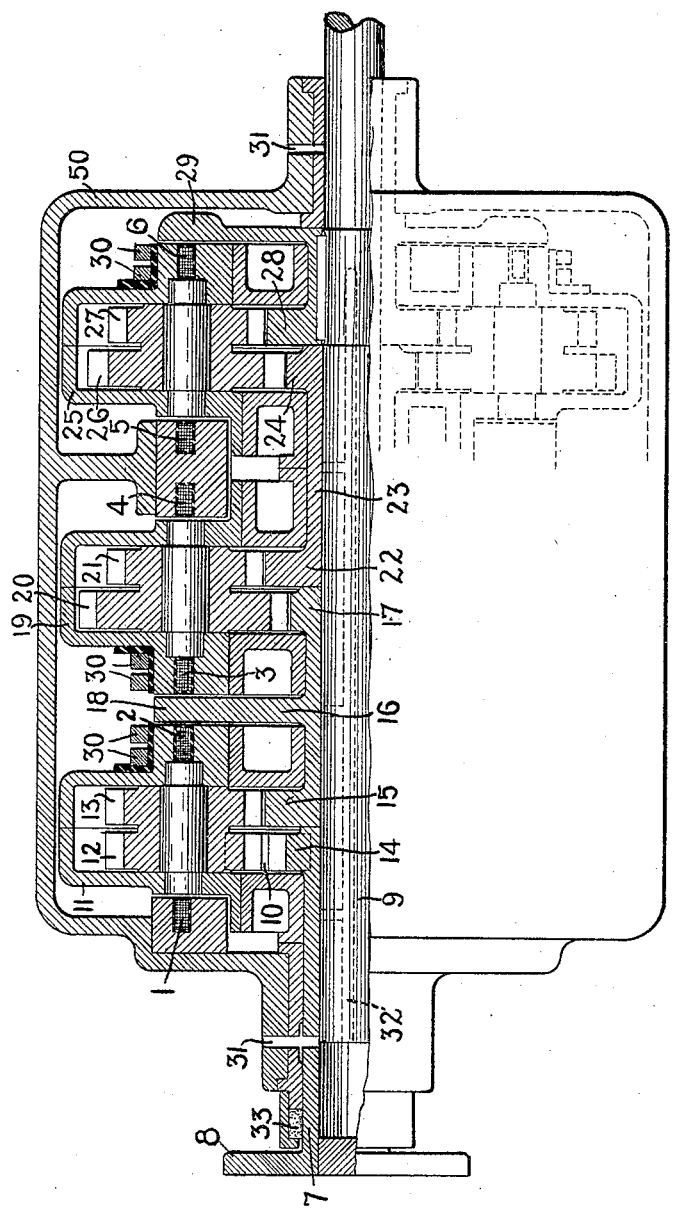
Witnesses.
Inventor:
Charles G. Simonds.
by Albert S. Davis
Atty.

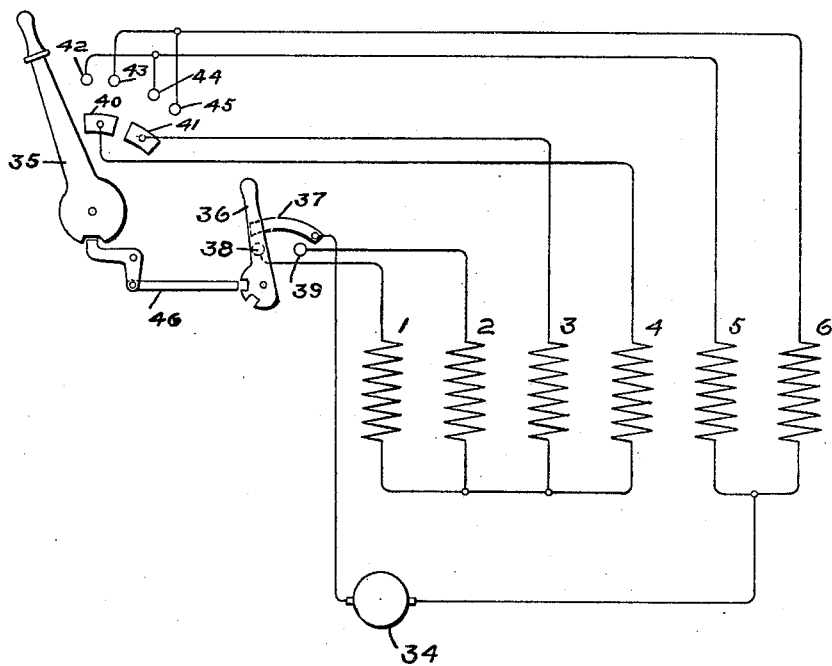

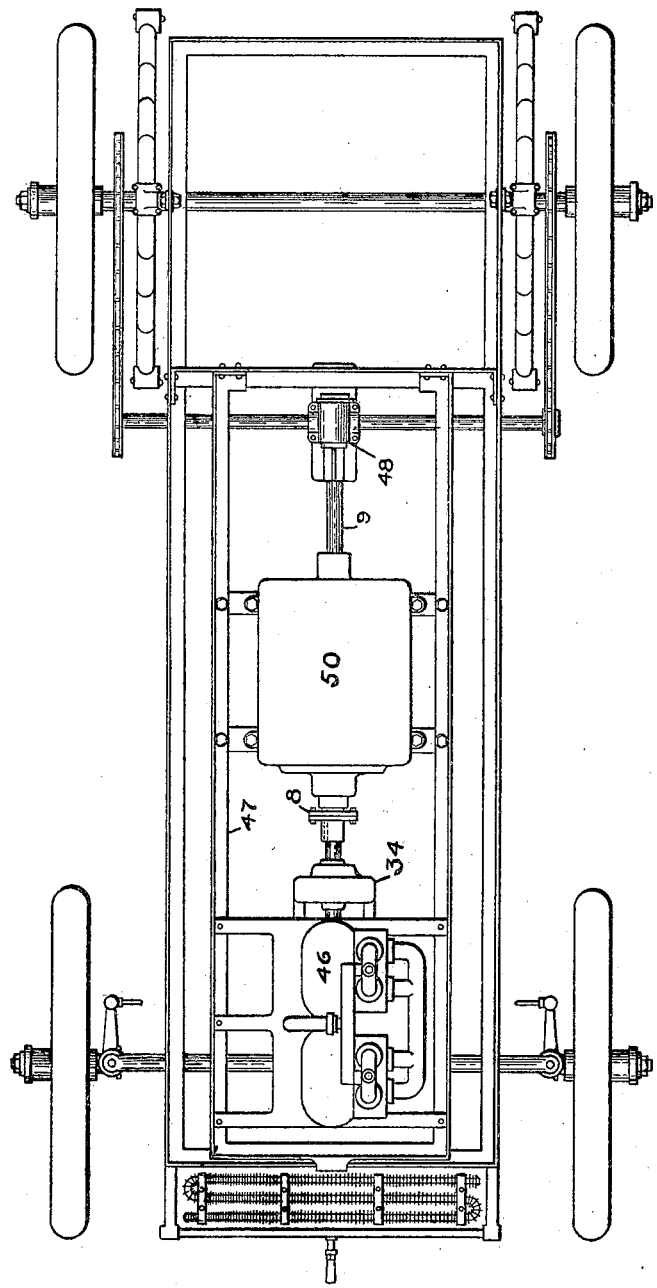

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

POWER-TRANSMISSION MECHANISM.

No. 799,805.      Specification of Letters Patent.      Patented Sept. 19, 1905.

Application filed April 8, 1904. Serial No. 202,144.

*To all whom it may concern:*

Be it known that I, CHARLES G. SIMONDS, a citizen of the United States, residing at Schenectady, county of Schenectady, State of New York, have invented certain new and useful Improvements in Power-Transmission Mechanisms, of which the following is a specification.

My invention relates to variable-speed-transmission gears; and its object is to provide a simple and compact form of transmission mechanism by means of which the direction of rotation of the driven member may be reversed and a plurality of speeds obtained in either direction and which may be controlled in a simple and efficient manner.

The above characteristics render a transmission mechanism constructed in accordance with my invention particularly suitable for automobile-drives.

My invention will best be understood from the accompanying drawings, in which—

Figure 1 shows a side view, partly in cross-section, of a transmission mechanism arranged in accordance with my invention. Fig. 2 shows diagrammatically the arrangement of control-circuits, and Fig. 3 shows the mechanism applied to an automobile.

In Fig. 1, 7 represents a sleeve rotatable upon the shaft 9, said sleeve carrying at one end a flange 8, by means of which it may be attached to the prime mover, and at the other end a pinion 14. 11 represents a rotatable member or box which is mounted to rotate on the outside of sleeve 7 and which carries the two rigidly-connected gears 12 and 13 on the same pin or shaft and which also carries an idler 10. (Shown in dotted lines.) The idler 10 engages the pinion 14 and is engaged in the gear 12. The gear 13 engages the pinion 15, carried by the sleeve 16, which is rotatably mounted on shaft 9. 1 and 2 represent magnetic clutches. Clutch 1 is stationary and when energized locks rotatable member 11 against rotation. Clutch 2, carried by member 11, when energized engages the armature 18, carried by the sleeve 16, and thus locks member 11 to sleeve 16, preventing any relative rotation of pinions 13 and 15. 19 is a similar rotatable box carrying the two gears 20 and 21, mounted on the same shaft or pin, which engage pinions 17 and 22, respectively, which are respectively carried by sleeves 16 and 23. The clutch 3 when energized locks the rotatable member 19 to armature 18, and thereby to sleeve 16. Stationary clutch 4 when energized prevents rotation of member 19. Similarly, member 25 carries the gears 26 and 27, which engage pinions 24 and 28, respectively. Pinion 24 is carried by sleeve 23, while pinion 28 is keyed to shaft 9. 5 is a stationary clutch which when energized prevents rotation of member 25. 6 is a clutch carried by the member 25, which when energized engages the armature 29, which is keyed to shaft 9, and thereby locks member 25 to the shaft. The operation is then as follows: Considering first the movable member 11, it will be seen that if clutch 1 is energized and movable member 11 thereby locked against rotation pinion 14 will drive gear 12 through the idler 10, and gear 13, which is formed from the same piece as gear 12 or rigidly secured thereto, will consequently drive pinion 15. Moreover, owing to the presence of the idler 10 pinion 15 will be driven in the opposite direction to the direction of rotation of pinion 14. On the other hand, if clutch 1 is deënergized and clutch 2 is energized member 11 will be locked to sleeve 16 by means of armature 18 and relative rotation of pinions 13 and 15 and of pinion 13 relative to member 11 will be prevented. Consequently movement of idler 10 relative to member 11 will also be prevented. Consequently there is a rigid connection from pinion 14 through idler 10, gears 12 and 13, and pinion 15 to sleeve 11. Sleeves 7 and 16 will consequently rotate together as a single member, and the direction of rotation of sleeve 16 will be opposite to that when clutch 1 is energized. In the same manner if clutch 4 is energized stationary member 19 is locked against rotation, and consequently when sleeve 16 is driven pinion 17 will drive gear 20 and gear 21 will drive pinion 22 in the same direction as pinion 17 and with a speed depending upon the relative sizes of the several pinions. On the other hand, if clutch 3 is energized member 19 will be locked to sleeve 16 through armature 18, and sleeve 16 will be rigidly connected to sleeve 23 through the pinions 17, 20, 21, and 22, and the two sleeves will rotate together as though formed from a single piece of metal. In the same way when clutch 5 is energized member 25 will be locked against rotation, and pinion 24 will drive pinion 28, which is keyed to the shaft, at a speed depending upon the reduction through gears 26 and 27. If clutch 6 is energized, member 25 will be locked to the shaft and a rigid connection will be formed from sleeve 23 through member 25 and the pinions to the shaft. In order to prevent lateral thrust on the sleeves or shaft, each member 11, 19, and 25 carries two or more pairs of gears, as indicated in dotted lines. Current is carried to the rotating clutches by means of collector-rings 30, as shown. 31 represents an oil-well by means of which oil may be carried into the shaft, filling the chamber within the hollow sleeve 7 and passing through the duct 32 in the shaft to the several rotating sleeves. 33 is a packing-ring which prevents leakage of oil along the shaft.

Referring now to Fig. 2, the clutch connections and control will be explained. 1, 2, 3, 4, 5, and 6 represent the coils of the clutches similarly designated in Fig. 1. 34 represents any suitable and convenient source of current. 35 represents the main switch for obtaining the speed variation, and 36 represents the reversing-switch interlocked with switch 35 by any suitable interlock, such as indicated at 46. Assume the reversing-switch 36 to be in the position shown and let switch 35 be moved to engage with contacts 40 and 42. The circuit is then closed as follows: from the source 34 to contact 37, through switch 36 to contact 38, through clutch 1, through clutch 4, contact 40, contact 42, clutch 5, and back to the source. Clutches 1, 4, and 5 are consequently energized. Referring again to Fig. 1, it will be seen that with these clutches energized members 11, 19, and 25 are all stationary, and sleeve 7 consequently drives sleeve 28 and shaft 9 through the speed reductions of all the pinions and, since idler 10 is included in the gear-train, in a direction opposite to that of sleeve 7. Now if switch 35 is moved to engagement with contacts 43 and 40 clutch 5 is deënergized and clutch 6 is energized. By referring again to Fig. 1 it will be seen that member 25 is now locked to the shaft and a rigid connection formed from sleeve 23 to shaft 9 through member 25. The speed reduction due to gears 26 and 27 is thereby removed from the gear-train. If switch 35 is moved to engage contacts 44 and 41, clutches 4 and 6 are deënergized and clutches 3 and 5 placed in circuit. Consequently member 25 is again held stationary, while member 19 is locked to sleeve 16. The speed reduction of gears 26 and 27 is consequently substituted for that of 20 and 21, and as the former is a smaller reduction the speed is increased. Now if switch 35 be moved to engage contacts 41 and 45 clutch 5 is deënergized and clutch 6 is placed in circuit. In this position member 19 is locked to sleeve 16 and member 25 to the shaft, so that a rigid connection is formed from sleeve 16 to shaft 9. This is the high-speed backward position, the only gear reduction being that through idler 10 and gears 12 and 13. Now if switch 35 is moved to its off position, as shown in Fig. 2, and switch 36 moved to engage contact 39 clutch 1 will be deënergized and clutch 2 included in circuit. This is the position of switch 36 for forward rotation, and member 11 is locked to sleeve 16, thereby forming a rigid connection between sleeves 7 and 16 for all positions of the controlling-switch 35. As the controlling-switch 35 is again moved forward through its several positions the several speed reductions will be serially cut out, as heretofore described, until when switch 35 is in engagement with contacts 41 and 45 a rigid connection exists from sleeve 7 through to shaft 9, so that sleeve 7 and shaft 9 rotate together as though formed of a single piece and all gear losses are eliminated. This is the high-speed forward position.

Fig. 3 shows the power-transmission mechanism of Fig. 1 applied to an automobile. In Fig. 3, 46 represents a prime mover, such as a gas-engine, supported by the frame 47 and carrying on its shaft the small generator 34 for applying the magnetic clutches. The engine-shaft is coupled to the driving-flange 8 of the transmission mechanism 50. The driven shaft at 9 is connected through the differential gears 48 in the usual manner to the driving-wheels of the vehicle.

I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In a power-transmission device, a driving member, a driven member, a series of rotatable members, two rigidly-connected gears rotatably mounted on each of said rotatable members, a series of pinions engaging said gears and connecting said rotatable members to each other and to the driving and driven members, and means for holding any or all of said rotatable members stationary and for locking any of them to a pinion.

2. In a power-transmission mechanism, a driving member, a driven member, a series of rotatable members, two rigidly-connected gears rotatably mounted on each of said rotatable members, a series of pinions connecting said rotatable members to each other and to the driving and driven members, and a series of electromagnetic clutches adapted when selectively energized to hold any or all of said rotatable members stationary or to lock any or all of said members to a pinion.

3. In a power-transmission mechanism, a driving member, a driven member, a series of rotatable members, two rigidly-connected gears rotatably mounted on each of said rotatable members, a series of pinions connecting said rotatable members to each other and to the driving and driven members, a series of electromagnetic clutches adapted when selectively energized to hold any or all of said rotatable members stationary or to lock any or all of said members to a pinion, a source of current for said clutches, and a controlling-switch adapted to connect the windings of said clutches selectively to said source.

4. In a power-transmission device, a driving member, a driven member, a series of rotatable members, two rigidly-connected gears rotatably mounted on each of said rotatable members, an idler rotatably mounted on one of said rotatable members, a series of pinions connecting said rotatable members to each other and to the driving and driven member, and means for holding any or all of said rotatable members stationary and for locking any or all of said members to a pinion.

5. In an automobile, a prime mover, a driven member adapted to be connected to the driving-wheels of the vehicle, a series of rotatable members, two rigidly-connected gears rotatably mounted on each of said rotatable members, a series of pinions engaging said gears and connecting said rotatable members to each other and to the prime mover and driven member, and means for holding any or all of said rotatable members stationary and for locking any or all of them to a pinion.

6. In an automobile, a prime mover, a driven member adapted to be connected to the driving-wheels of the vehicle, a series of rotatable members, two rigidly-connected gears rotatably mounted on each of said rotatable members, an idler rotatably mounted on one of said rotatable members, a series of pinions engaging said gears and connecting said rotatable members to each other and to the prime mover and driven member, and means for holding any or all of said rotatable members stationary and for locking any or all of them to a pinion.

7. In an automobile, a prime mover, a driven member adapted to be connected to the driving-wheels of the vehicle, a series of rotatable members, two rigidly-connected gears rotatably mounted on each of said rotatable members, an idler rotatably mounted on one of said rotatable members, a series of pinions engaging said gears and connecting said rotatable members to each other and to the prime mover and driven member, a series of electromagnetic clutches adapted and arranged to hold any or all of said rotatable members stationary and to lock any or all of them to a pinion, a source of current for said clutches, and a controlling-switch adapted to connect the windings of said clutches selectively to said source.

In witness whereof I have hereunto set my hand this 6th day of April, 1904.

CHARLES G. SIMONDS.

Witnesses:
BENJAMIN B. HULL,
HELEN ORFORD.